C. E. McCARREN.
ICE CREAM SPOON.
APPLICATION FILED JUNE 26, 1908.

900,573.

Patented Oct. 6, 1908.

Witnesses
Edwin G. McKee
J. F. Byrne

Inventor
Charles E. McCarren

By Victor J. Evans
Attorney

UNITED STATES PATENT OFFICE.

CHARLES E. McCARREN, OF CINCINNATI, OHIO.

ICE-CREAM SPOON.

No. 900,573.  Specification of Letters Patent.  Patented Oct. 6, 1908.

Application filed June 26, 1908. Serial No. 440,564.

*To all whom it may concern:*

Be it known that I, CHARLES E. McCARREN, a citizen of the United States, residing at Cincinnati, in the county of Hamilton and State of Ohio, have invented new and useful Improvements in Ice-Cream Spoons, of which the following is a specification.

My invention relates to improvements in ice cream spoons of that type comprising a handle, a bowl secured to the handle, scrapers mounted in the bowl, and scraper operating means mounted upon the handle.

One object of my invention is the provision of an ice cream spoon wherein the scrapers, when in normal position, lie one in engagement with the other in the deepest portion of the bowl, whereby to permit either side of the spoon to be dipped into the ice cream.

A further object of the invention is the provision of an ice cream spoon wherein the scrapers will, upon the operation of the scraper operating means, be moved in opposite directions to the edge of the bowl, whereby to free the ice cream from every portion of the bowl, thus permitting the ice cream to be readily discharged from the spoon.

A further object of the invention is the provision of an ice cream spoon wherein the several elements may be readily and quickly disassociated to permit a thorough cleansing of every part of the spoon.

A still further object of the invention is the provision of an ice cream spoon which is simple, durable and efficient and which may be manufactured and sold at a comparatively low cost.

Figure 1:
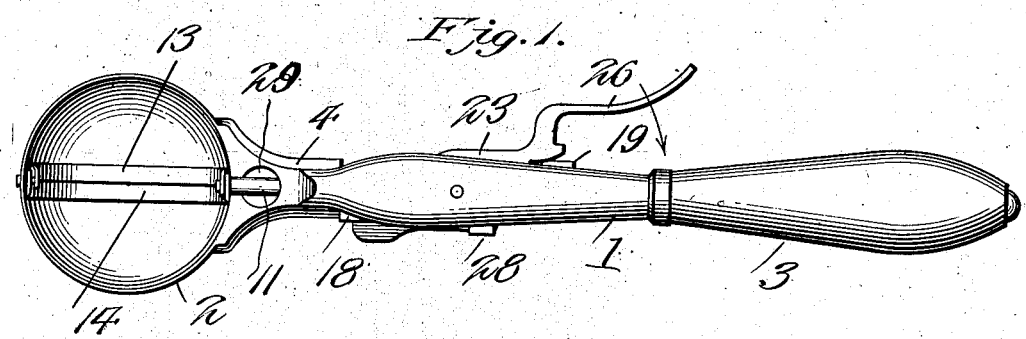
Figure 2:
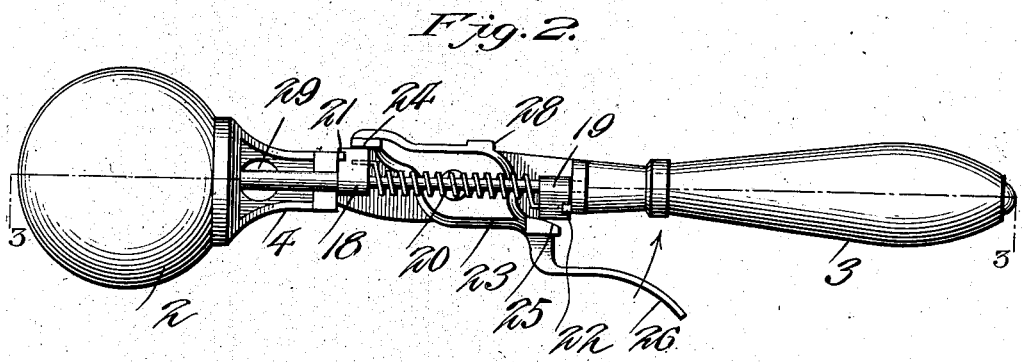
Figure 3:
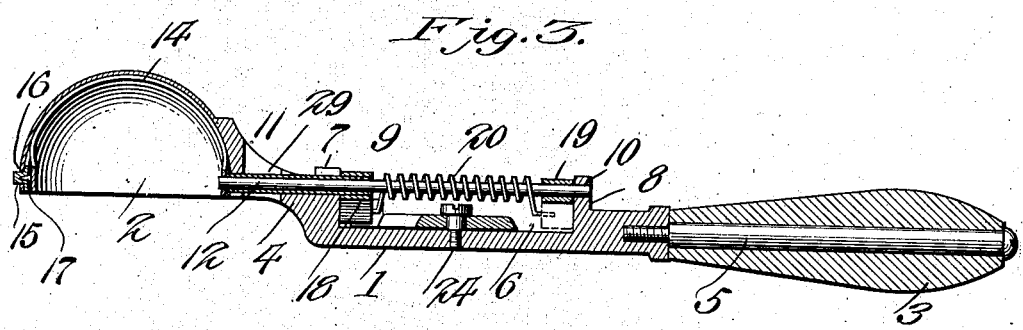

With the above and other objects in view the invention consists in the construction, combination and arrangement of parts hereinafter fully described and claimed, and illustrated in the accompanying drawings, wherein Figure 1 is a top plan view of an ice cream spoon constructed in accordance with my invention. Fig. 2 is a bottom plan view thereof, and Fig. 3 is a longitudinal sectional view taken on the plane indicated by the line 3—3 of Fig. 2.

Referring to the drawings by reference numerals 1 designates the shank, 2 the bowl, and 3 the handle of my improved ice cream spoon. The bowl 2 is preferably semi-cylindrical and is secured to the shank 1 in off-set relation through the medium of a downwardly and forwardly curved extension 4.

The handle 3 is preferably constructed of wood, and is secured to the shank 1 by means of a bolt 5. The under side of the shank 1 is provided with a recess 6 and the end walls of said recess are continued downwardly to provide lugs 7 and 8. The lug 7 is provided with an open bearing 9 and the lug 8 is provided with a circular bearing 10. The bearing 9 extends through the extension 4 and through the bowl 2, as fully disclosed in Fig. 3 of the drawings. A hollow cylindrical shaft 11 is journaled in the bearing 9, and a solid cylindrical shaft 12 is journaled in the shaft 11 and in the bearing 10. The inner ends of the shafts 11 and 12 are disposed within the bowl 2 and the inner end of the shaft 12 projects inwardly beyond the inner end of the shaft 11.

A substantially semi-annular scraper 13 is secured at one end to the inner end of the shaft 11, and a similarly constructed scraper 14 is secured at one end to the inner end of the shaft 12. The scrapers 13 and 14 are disposed in the bowl 2 and the opposite end of the scraper 14 is provided with a journaled lug 15 which is mounted in a bearing opening 16 located in the bowl 2 at a point diametrically opposite the bearing 9. The opposite end of the scraper 13 is provided with a journal 17 which is mounted in a bearing recess formed in the lug 15 of the scraper 14. When in normal position the scrapers 13 and 14 lie one in engagement with the other in the deepest portion of the bowl 2. The shafts 11, 12 are adapted to be rotated in a manner to move the scrapers in opposite directions to the edge of the bowl. The normal position of the scrapers permits either side of the spoon to be dipped into the ice cream, and the movement of the scrapers frees the ice cream from every portion of the bowl. As the ice cream is freed from every portion of the bowl it may be readily and quickly discharged from the spoon.

The outer end of the shaft 11 projects a little beyond the lug 7 of the shank 1. An arm 18 is secured to the projecting end of the shaft 11 and projects laterally therefrom, the arm contacting with the adjacent end wall of the recess 6. An arm 19 is secured to the shaft 12 and projects laterally therefrom, the arm contacting with the adjacent end wall of the recess 6 and projecting from the shaft in a direction opposite to the direction in which the arm 18 projects from the shaft 11. A torsional spring 20 is mounted upon the shaft 12 between the arms 18 and 19, the ends of the shafts being arranged in sockets formed in the opposing sides of the arms. The spring 20 acts to rotate the shafts 11 and 12 in opposite directions, the direction being such as to cause the scrapers 13 and 14 to travel in the direction of each other. The rotations of the shafts through the medium of the spring are limited by means of stops 21 and 22 carried respectively by the lugs 7 and 8 and designed to be respectively engaged by the arms 18 and 19. When the arms 18 and 19 have been moved into engagement with the stops 21 and 22 through the action of the spring 20, the scrapers 13 and 14 lie closed one in contact with the other in the deepest portion of the bowl 2. The shafts 11 and 12 are adapted to be rotated in the reverse directions through the medium of a lever 23, the rotating of the shafts through the medium of the lever causing the scrapers 13 and 14 to be moved in opposite directions to the edge of the bowl 2. The lever 23 is pivotally mounted in the recess 6 by means of a bolt 24 which passes therethrough and has threaded engagement with the shank 1. Lugs 24 and 25 are secured to the lever 23 and are adapted to engage the arms 18 and 19 respectively. The engagement between the lugs and arms is such that when the lever is moved in one direction the shafts 11 and 12 are rotated in the reverse direction, the rotations of the shafts being such as to cause the scrapers 13 and 14 to move in opposite directions to the edge of the bowl 2. The lever is adapted to be operated through the medium of a thumb piece 26 which is adapted to be moved in the direction of the handle 3 when it is desired to operate the scrapers 13 and 14 to free the ice cream from the bowl 2. The movement of the lever 23 is limited by a stop 27 and which projects therefrom in a direction to contact with one edge of the shank 1 when the lever has reached the limit of its movement in either direction. When the power which operated the lever 23 is removed, the spring 20 rotates the shafts 11 and 12 in opposite directions to that in which they are rotated by the operation of the lever, thus returning the parts of the ice cream spoon to their normal positions.

The parts of the ice cream spoon may be readily and quickly disassociated to permit the spoon to be thoroughly cleaned.

When it is desired to disassociate the parts the journals of the scrapers 13 and 14 are withdrawn from their respective bearings, and the scrapers are moved out of the bowl, after which the shaft 12 is moved longitudinally to withdraw its outer end from the bearing opening 10. The extension 4 is provided with an opening 29 which intersects the bearing 9. After the outer end of the shaft 12 has been withdrawn from the bearing 10 the shafts are tilted and moved in a direction to pass the scrapers 13 and 14 through the opening 29, after which the scrapers, shafts and parts carried thereby are removed from the spoon. When it is desired to remove the lever 23 it is only necessary to first remove the bolt 24.

It should be apparent from the above description that I provide an ice cream spoon which comprises comparatively few parts and which may be manufactured and sold at a comparatively low cost. It should also be apparent that very little power is required in the operation of the spoon, and that the ice cream may be readily and quickly discharged from the bowl of the spoon. As the several elements of the spoon may be readily and quickly disassociated the spoon may be at all times retained in a sanitary condition.

Changes in the form, proportions and minor details of construction may be made within the scope of the claims without departing from the spirit or sacrificing any of the advantages of the invention.

Having thus described the invention, what is claimed as new is:—

1. An ice cream spoon comprising a shank, a bowl secured to the shank, scrapers journaled in the bowl, the scrapers occupying the deepest portion of the bowl when in normal position, and means by which the scrapers can be operated.

2. An ice cream spoon comprising a shank, a bowl secured to the shank, scrapers journaled in the bowl, the scrapers lying one in contact with the other in the deepest portion of the bowl when in normal position, and means by which the scrapers can be operated.

3. An ice cream spoon comprising a shank, a bowl secured to the shank, scrapers journaled in the bowl, the scrapers lying one in engagement with the other in the deepest portion of the bowl when in their normal position, and means by which the scrapers can be moved in opposite directions to the edge of the bowl.

4. An ice cream spoon comprising a shank, a bowl secured to the shank, shafts journaled on the shank, scrapers carried by the bowl and shafts, and means by which the shafts may be moved in reverse directions.

5. An ice cream spoon comprising a shank, a bowl secured to the shank, shafts journaled on the shank, scrapers connected to the shafts and bowl, means by which the shafts may be rotated in reverse directions to operate the scrapers, and means acting upon the shafts to yieldingly retain the scrapers in their normal positions.

6. An ice cream spoon comprising a shank, a bowl secured to the shank, shafts journaled on the shank, scrapers mounted in the bowl and connected to the shafts, means by which the shafts may be rotated to operate the scrapers, and means adapted to yieldingly retain the scrapers in their normal position.

7. An ice cream spoon, comprising a shank, a hollow shaft journaled on the shank, another shaft journaled on the shank and passing through the hollow shaft, a bolt secured to the shank, scrapers mounted on the bolt and connected to the shafts, and means by which the shafts can be rotated to operate the scrapers.

8. An ice cream spoon comprising a shank, a hollow shaft journaled on the shank, another shaft journaled on the shank and passing through the hollow shaft, a bolt secured to the shank, scrapers mounted on the bolt and connected to the shafts, means by which the shafts can be operated to rotate the scrapers, and means adapted to yieldingly retain the scrapers in their normal position.

9. An ice cream spoon comprising a shank, a bolt secured to the shank, shafts journaled on the shank, scrapers mounted in the bowl and connected to the shafts, arms secured to the shafts, a lever pivotally mounted upon the shank, and lugs upon the lever, said lugs engaging the arms.

10. An ice cream spoon comprising a shank, a bowl secured to the shank, shafts journaled on the shank, scrapers mounted in the bowl and connected to the shafts, arms secured to the shafts, a lever mounted upon the shank and provided with lugs adapted to engage the arms, and a spring coiled about one of the shafts and having its end connected to the arm.

In testimony whereof I affix my signature in presence of two witnesses.

CHARLES E. McCARREN.

Witnesses:
M. W. CONWAY,
GEORGE WEBER.